US010981575B2

United States Patent
Kang et al.

(10) Patent No.: US 10,981,575 B2
(45) Date of Patent: Apr. 20, 2021

(54) SYSTEM AND METHOD FOR ADAPTIVE ADVANCED DRIVER ASSISTANCE SYSTEM WITH A STRESS DRIVER STATUS MONITOR WITH MACHINE LEARNING

(71) Applicant: DENSO International America, Inc., Southfield, MI (US)

(72) Inventors: Te-Ping Kang, Ann Arbor, MI (US); Yu Zhang, Farmington Hills, MI (US); Bilal Alasry, Dearborn, MI (US); Vikas Upmanue, Novi, MI (US); Jordan Necovski, Livonia, MI (US); Sean Bleicher, Fenton, MI (US); Doua Vang, Waterford, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 0 days.

(21) Appl. No.: 16/287,341

(22) Filed: Feb. 27, 2019

(65) Prior Publication Data

US 2020/0269849 A1    Aug. 27, 2020

(51) Int. Cl.
*B60W 40/08* (2012.01)
*B60W 10/22* (2006.01)
*G06N 20/00* (2019.01)
*G06K 9/00* (2006.01)

(52) U.S. Cl.
CPC ............ *B60W 40/08* (2013.01); *B60W 10/22* (2013.01); *G06K 9/00845* (2013.01); *G06N 20/00* (2019.01); *B60W 2040/0872* (2013.01)

(58) Field of Classification Search
CPC ................. B60W 40/08; B60W 10/22; B60W 2040/0872; G06N 20/00; G06K 9/00845
See application file for complete search history.

(56) References Cited

U.S. PATENT DOCUMENTS

| 8,565,820 | B2 | 10/2013 | Riemer et al. |
| 9,721,474 | B2 | 8/2017 | Eskilson |
| 9,826,500 | B1 | 11/2017 | Boss et al. |
| 2003/0096593 | A1 | 5/2003 | Naboulsi |
| 2013/0144470 | A1* | 6/2013 | Ricci ....................... H04W 4/90 701/2 |
| 2014/0277932 | A1* | 9/2014 | Prakah-Asante ... H04M 1/6091 701/36 |
| 2016/0001781 | A1* | 1/2016 | Fung ...................... G16H 50/20 701/36 |
| 2016/0231743 | A1* | 8/2016 | Bendewald ....... B60W 50/0097 |
| 2017/0297564 | A1* | 10/2017 | Xi ........................ B60W 30/025 |
| 2018/0099678 | A1* | 4/2018 | Absmeier .......... A61M 21/0094 |
| 2018/0208209 | A1* | 7/2018 | Al-Dahle .......... B60W 50/0098 |
| 2019/0061772 | A1* | 2/2019 | Prinz ........................ A61B 5/18 |
| 2019/0133511 | A1* | 5/2019 | Migneco ............. B60G 17/019 |

* cited by examiner

*Primary Examiner* — Mohamed Barakat
(74) *Attorney, Agent, or Firm* — Brooks Kushman P.C.

(57) ABSTRACT

A system in a vehicle, comprising one or more physiological sensors configured to obtain stress-load data indicating a stress load of an occupant of the vehicle, a controller in communication with the one or more physiological sensors, wherein the controller is configured to determine a stress load of the occupant utilizing at least the stress-load data and output an instruction to execute a vehicle driving-dynamics features when the stress load exceeds a threshold, wherein the vehicle driving-dynamics features includes adjusting an active suspension of the vehicle.

20 Claims, 4 Drawing Sheets

|  | Driver stage | | | |
| --- | --- | --- | --- | --- |
|  | Calm | Nervous | Distracted emotional | Isolation seeking |
| Issues |  | Lost situational awareness because of too focus at front. Missing blind spots, missing exits. Slamming brake or throttle | Easy to immerse to secondary task and lost situational awareness. Aroused and engage into loud singing, conversation, road rage, etc | too immerse to their own world and lost situational awareness. Mind wandering |
| Stress level | low | high | Very high / low but distracted | Very low |
| Target solution |  | Non distracted but stress level over threshold | Stress level exceeded threshold, or distracted | Non distracted but stress level is too low, almost into sleep stage |
| Proposed solution |  | Change dynamic settings to smooth driving. Make ADAS such as blind spot warning more audible/visible. Engage "do not disturb" mode to reduce possible distraction | Soften vehicle dynamic and disengage from high speed pursuit. Automatically engage AD if driver lost the ability to drive responsibly | Quietly increase following distance, soften suspension for smoother ride. Pre warning for upcoming slowing down due to traffic ahead, etc |

FIG. 4

SYSTEM AND METHOD FOR ADAPTIVE ADVANCED DRIVER ASSISTANCE SYSTEM WITH A STRESS DRIVER STATUS MONITOR WITH MACHINE LEARNING

TECHNICAL FIELD

The present disclosure relates to monitoring of an occupant's stress level.

BACKGROUND

Vehicles may be configured to monitor a stress level of an occupant. Vehicles may have various features that may alternate the comfort of the ride of the vehicle. Other vehicle features may be referred to as advanced driver assistance systems (ADAS) features.

SUMMARY

According to one embodiment, a system in a vehicle, comprising one or more sensors configured to obtain stress-load data indicating a stress load of an occupant of the vehicle, a controller in communication with the one or more sensors, wherein the controller is configured to determine a stress load of the occupant utilizing at least the stress-load data and output an instruction to execute a vehicle driving-dynamics features when the stress load exceeds a threshold, wherein the vehicle driving-dynamics features includes adjusting an active suspension of the vehicle.

According to a second embodiment, a system in a vehicle comprising one or more sensors configured to obtain stress-load information indicating a stress load of an occupant of the vehicle, a display configured to output information, a controller in communication with the one or more sensors and the display, wherein the controller is configured to determine a stress load of the occupant utilizing at least the stress-load information, output an instruction to execute a vehicle driving-dynamics features when the stress load exceeds a threshold, wherein the vehicle driving-dynamics features includes adjusting an active suspension of the vehicle, and output on the display a notification of activating the vehicle driving-dynamics.

According to a third embodiment, a method in a vehicle comprises obtaining stress-load data of an occupant of the vehicle from one or more vehicle sensors, determining the stress load of the occupant utilizing at least the stress-load data, activating a vehicle driving-dynamics features when the stress load exceeds a threshold, and notifying the occupant of activation of the vehicle driving-dynamics features.

BRIEF DESCRIPTION OF THE DRAWINGS

FIG. 4 illustrates an exemplary table of driver stages of stress level categories.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
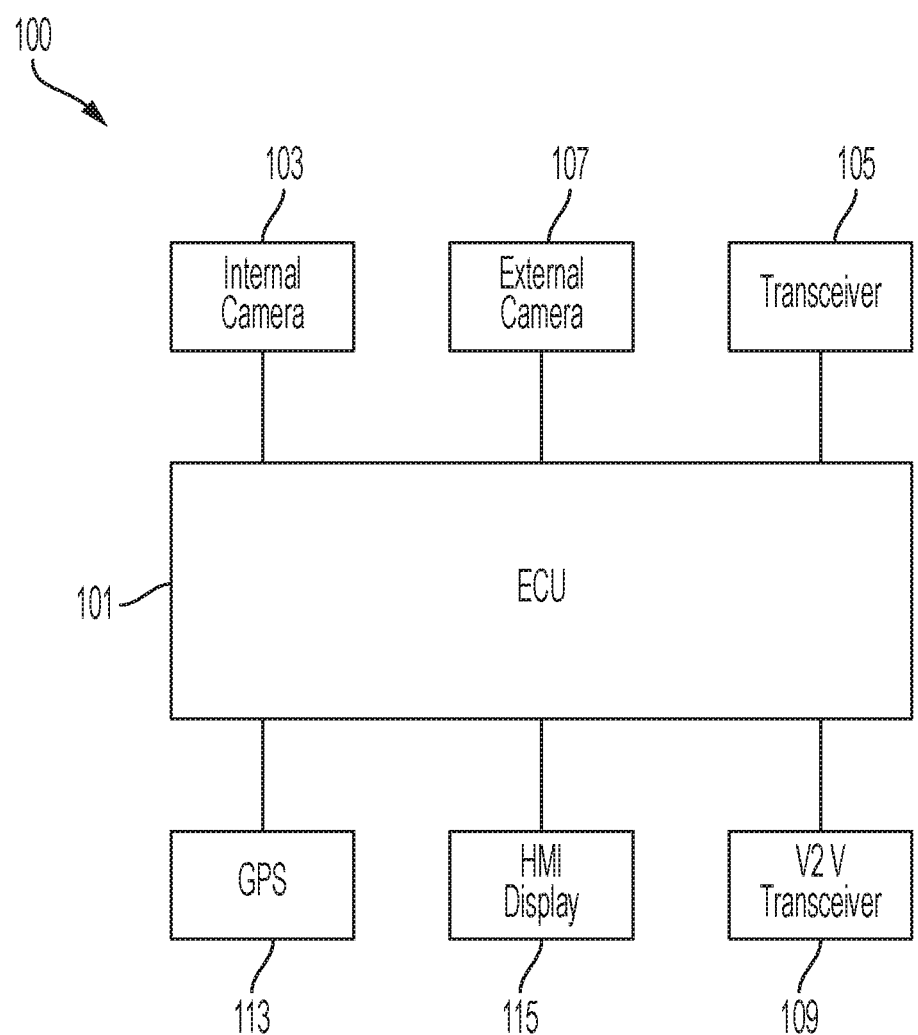
FIG. 1 illustrates an example block diagram of a vehicle system 100. The system 100 may include a controller 101.

FIG. 1 illustrates an example block diagram of a vehicle system 100. The system 100 may include a controller 101. The controller 101 may be a vehicle controller such as an electronic control unit (ECU). The controller 101, also referred to herein as ECU 101, may be embodied in a processor configured to carry out instructions for the methods and systems described herein. The controller 101 may include a memory (not individually shown in FIG. 1), as well as other components specific processing within the vehicle. The controller 101 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The controller 101 may be in communication with various sensors, modules, and vehicle systems both within and remote of a vehicle. The system 100 may include such sensors, such as various cameras, a LIDAR sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 1, the system 100 may include an in-cabin monitor system 103, a transceiver 105, a vehicle-to-vehicle transceiver 109, a GPS module 113, a human-machine interface (HMI) display as well as other sensors, controllers, and modules. FIG. 1 is an example system and the system 100 may include more or less sensors, and of varying types. Further, while the vehicle of FIG. 1 is shown with specific sensors in specific locations for purposes of illustration, the system 100 may be equipped with additional sensors at different locations within or on the vehicle, including additional sensors of the same or different type. As described below, such sensors may be utilized to determine a cognitive load of an occupant of the vehicle.

The vehicle system 100 may be equipped with a transceiver 105. The transceiver 105 may be a BLUETOOTH transceiver. In one illustrative embodiment, the system 100 uses the BLUETOOTH transceiver 105 to communicate with a user's mobile device (e.g., cell phone, smart phone, PDA, tablet, or any other device having wireless remote network connectivity). The mobile device can then be used to communicate with a network outside the vehicle system 100 through, for example, communication with a cellular tower. In some embodiments, tower may be a WiFi access point. The mobile device could also be used to track the occupants' phone interaction (e.g. web browsing, texting).

If the user has a data-plan associated with the mobile device, it is possible that the data-plan allows for broad-band transmission and the system could use a much wider bandwidth (speeding up data transfer). In still another embodiment, mobile device is replaced with a cellular communication device (not shown) that is installed to vehicle. In yet another embodiment, the mobile device may be a wireless local area network (LAN) device capable of communication over, for example (and without limitation), an 802.11g network (i.e., WiFi) or a WiMax network. In one embodiment, incoming data can be passed through the mobile device via a data-over-voice or data-plan, through the onboard BLUETOOTH transceiver and into the vehicle's ECU 101. In the case of certain temporary data, for example, the data can be stored on the HDD or other storage media until such time as the data is no longer needed.

In another embodiment, the transceiver 105 may be on on-board communication device or cellular modem. The on-board communication device may not require a cellular phone (e.g. mobile device) to be paired with a BLUETOOTH transceiver to communicate to an off-board server. Instead, the on-board modem may have its own capability to communicate with an off-board network.

An in-cabin monitor system 103 may include a driver status monitoring system (DSM) and an occupant monitoring system (OMS). DSM focused on the primary occupant who making driving maneuver decisions. OMS focused on other occupants who are not involved in driving decisions. Both DSM and OMS may include in-vehicle cameras, which may be utilized to capture images of an occupant in the vehicle. The in-vehicle camera may obtain facial information about an occupant, such as eye-movement of the occupant and head-movement of the occupant, as discussed further below. The in-vehicle camera may be a color camera, infrared camera, or time of flight camera.

A controller may receive driver status data from the DSM to determine an abnormal situation within the vehicle. The DSM employs one or more activity sensors such as a driver-facing camera, a health scanner, and a driver performance evaluator to monitor activities performed by the driver. Based on the activity sensors, the driver status module may determine whether the driver is, for example, distracted, sick, or drowsy as the abnormal situation.

The DSM may be mounted at the meter console to capture the driver's face, especially the driver's eyes. The DSM module or ECU 101 may process data received from the driver-facing camera and monitors whether the driver looks away from the road based on the driver's gaze direction. If the driver looks away, the driver status module or ECU 101 determines the abnormal situation. The driver status module or ECU 101 may also determine whether the driver is drowsy or alert based on how much the driver's eye opens and for how long. In addition, driver status module or ECU 101 may also identify a cognitive load of the user. The driver-facing camera may be utilized for identification of a driver and utilized for possible video conferencing.

A health scanner may be mounted on the steering wheel or suitable location which the driver touches. A health scanner may also use on-contact sensors such as infrared cameras. The health scanner scans physiological features (such as heartbeat, skin conductance level, blood pressure). The DSM module or ECU 101 processes data received from the health scanner and monitors whether the driver is suffering from a severe physical condition or episode, such as a heart attack based on the heartbeat. If the driver is suffering from the serve physical condition or episode, the driver status module determines an abnormal situation. Thus, the DSM may collect stress load information from the occupant to later be utilized to determine a stress level of the occupant.

The health scanner may include multiple sensors utilized to monitor a primary occupant or secondary occupants. The sensors may include primary occupant facing camera that is configured to capture eye movement and a facial expression of the occupant. The sensors may also include a biometric or physiological sensor for heart rate, respiration rate, blood pressure, brain activity, skin conductance level, body temperature, etc. via contact-based or non-contact-based sensors. Such sensors may be utilized to obtain stress load data from an occupant. The sensors may include a set of vehicle dynamic sensor, which collect information to assess the quality of driving or the level of maneuver difficulty based on metrics such as speed, acceleration, steering entropy. The other sensors may include whole cabin imaging monitor system to detect and predict the interaction between the primary and other occupants. The sensors may also include audio processing unit to detect and predict the interaction between the primary and other occupants. The multiple sensor includes a set of biometric or physiological sensors for heart rate, respiration rate, blood pressure, brain activity, skin conductance level, body temperature, etc via contact-based or non-contact based sensor. The system may utilize such information to predict the needs for future interaction between the primary and other occupants, as well as be utilized for stress load information and driver distraction information.

An DSM may be mounted on the ceiling of the vehicle or suitable location could observe user's interaction with other occupants of the car. The DSM may evaluate the actual cognitive demands or potential cognitive demands from interacting with other occupants. For example, if the DSM detects that the user is actively caring for the other occupants (e.g., passing food items, play request media), his/her cognitive load may be evaluated as high. In another example, if the DSM may detect an underage child has elevated temperature, it may predict the cognitive demand of the user may increase soon.

A driver performance evaluator may assess driver performance based on the vehicle dynamic data, collected either through embedded data source (such as the CAN bus) or installed data source (such as gyroscope, etc). The driver performance evaluator could be used decide whether a driver is sufficiently focused on the driving task or whether the driver is capable of dealing the current driving environment. The data collected from driver performance data may also be used identify a cognitive load of the user.

The vehicle system 100 may include an external driving environment monitor system (DEMS). The DEMS may include an external camera, which may be mounted in the rear-view mirror. The external camera may also be facing out of the vehicle cabin through a vehicle's windshield to collect imagery data of the environment in front of the vehicle. The external camera may be utilized to collect information and data regarding the front of the vehicle and for monitoring the conditions ahead of the vehicle. The camera may also be used for imaging the conditions ahead of the vehicle and correctly detecting the positions of lane markers as viewed from the position of the camera and the presence/absence, for example, of lighting of the head lights of oncoming vehicles. For example, the external camera may be utilized to generate image data related to vehicle's surrounding the vehicle, lane markings ahead, and other object detection. A vehicle may also be equipped with a rear camera (not shown) for similar circumstances, such as monitoring the vehicle's environment around the rear proximity of the vehicle. Such sensors may be utilized to collect driver distraction information from a surrounding of the vehicle. For example, the more vehicles identified by the external camera, the system may be utilized to calculate the driver's distraction and determine that the driver may be more distracted.

The DEMS 107 could also include other sensors, including the LIDAR sensors, radar sensors, etc. These sensors may be mounted anywhere on the vehicle. For example, it is possible for LIDAR sensors to be mounted on a roof a vehicle with a 360-degree view of the vehicle's surrounding. Furthermore, the various sensors may surround the vehicle to provide a 360-degree view of the vehicle. The vehicle may also be equipped with one or more cameras, one or more LIDAR sensors, one or more radar sensors, one or more ultrasonic sensors, and/or one or more other environmental sensors. Actuators may be utilized to adjust or control an angle of the field of view of the various sensors. Data from these sensors may be processed through DEMS or ECU 101 to identify objects. For example, a forward LIDAR sensor and corner LIDAR sensor may be utilized. The forward LIDAR sensor may be used to determine what vehicle and objects are in the front peripheral of the vehicle. A corner LIDAR sensor may be utilized to also detect and classify objects and used to enhance a vehicle's peripheral view of the vehicle's surrounding. A corner LIDAR sensor may be utilized to also detect and classify objects and used to enhance a vehicle's peripheral view of the vehicle's surrounding.

The forward radar sensor may be mounted in the front bumper of the vehicle. The corner radar sensor may be mounted in the corner of the bumper. Radar sensors may be configured to detect and classify objects to enhance a vehicle's peripheral view of the vehicle's surrounding. The radar sensors may be utilized to help or enhance various vehicle safety systems. The forward radar sensor may be built into a front bumper of the vehicle to determine that an object is ahead of the vehicle. The corner radar sensor may be located in the rear bumper or the side of the vehicle. The corner radar sensor may be utilized to determine if objects are in a driver's blind spot, as well as detecting vehicles or objects approaching from the rear on the left and right when reversing. Such functionality may allow a driver to navigate around other vehicles when changing lanes or reversing out of a parking space, as well as assist in autonomous emergency braking in order to avoid collisions that may be imminent.

The system 100 may also include a vehicle-to-vehicle or vehicle-to-infrastructure communication module (e.g. V2X module) 109. The V2X module 109 may be utilized to send and receive data from objects proximate to the vehicle. Such data may include data regarding the environment surrounding the vehicle or information about the object that the vehicle is communicating with utilizing the V2X module. In one scenario, the V2X module 109 might recognize non-line-of-sight hazards which will influence the current driving session. Such information may be utilized for driver distraction. The ECU 101 may determine the situation could become challenging soon for the driver to use an HMI presentation with a given level of complexity.

The system 100 may also include a global positioning system (GPS) 113 that detects or determines a current position of the vehicle. In some circumstances, the GPS 113 may be utilized to determine a speed that the vehicle is traveling. The system 100 may also include a vehicle speed sensor (not shown) that detects or determines a current speed that the vehicle is traveling. The system 100 may also include a compass or three-dimensional (3D) gyroscope that detects or determines a current direction of the vehicle. Map data may be stored in the memory. The GPS 113 may update the map data. The map data may include information that may be utilized with advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 101 may utilize data from the GPS 113, as well data/information from the gyroscope, vehicle speed sensor, and map data, to determine whether a location or current position of the vehicle are suitable to use an HMI presentation with a given level of complexity.

The system 100 may also include a human-machine interface (HMI) display 115. The HMI display 115 may include any type of display within a vehicle cabin. Such HMI displays may include a dashboard display, navigation display, multimedia display, heads-up display, thin-film transistor liquid-crystal display (TFT LCD), etc. The HMI display 115 may also be connected to speakers to output sound related to commands or the user interface of the vehicle. The HMI display 115 may be utilized to output various commands or information to occupants (e.g. driver or passengers) within the vehicle. For example, in an automatic braking scenario, the HMI display 115 may display message that the vehicle is prepared to brake and provide feedback to the user regarding the same. The HMI display 115 may utilize any type of monitor or display utilized to display relevant information to the occupants. The HMI display 115 may also include a heads-up display ("HUD") that is utilized to display an interface and other objects on a windshield so that the images are within a driver's periphery while driving.

The center controller panel or a remote controller may be mounted interior of the vehicle to control various vehicle systems. For example, the center controller panel or a remote controller could control an air conditioner, a music player, a video player, and a GPS navigation. The driver status module processes data received from the center controller panel or a remote controller and monitors whether the driver is distracted by non-driving tasks and his/her level of engagement on secondary task. A center controller panel may include a touch screen interface, knobs, buttons and other types of interaction method. A remote controller may be located at the steering wheel, in front of arm rest or other locations that accessible to the user. A remote controller may include touch-pads, knobs, buttons and other types of interaction method. For example, when the center controller panel or a remote controller is being operated as the vehicle is traveling, the driver is involved in secondary tasks that are potentially distracting the driver. If the driver is distracted, the driver status module ECU may determine the abnormal situation.

In addition to providing visual indications, the HMI display 115 may also be configured to serve as the center controller panel, receiving user input via a touch-screen, user interface buttons, etc. The HMI display 115 may be configured to receive user commands indicative of various vehicle controls such as audio-visual controls, autonomous vehicle system controls, certain vehicle features, cabin temperature control, etc. The controller 101 may receive such user input and in turn command a relevant vehicle system of component to perform in accordance with the user input.

The controller 101 can receive information and data from the various vehicle components including the in-cabin monitor system 103, the DSM 107, the GPS 113 and the HMI display 115. The controller 101 utilize such data to provide vehicle functions that may relate to driver assistance, or autonomous driving. For example, data collected by the in-cabin monitor system 103 and the DSM 107 may be utilized in context with the GPS data and map data to provide or enhance functionality related to adaptive cruise control, automatic parking, parking assist, automatic emergency braking (AEB), etc. The controller 101 may be in communication with various systems of the vehicle (e.g. the engine, transmission, brakes, steering mechanism, display, sensors, user interface device, etc.). For example, the controller 101 can be configured to send signals to the brakes to slow the vehicle 100, or the steering mechanism to alter the path of vehicle, or the engine or transmission to accelerate or decelerate the vehicle. The controller 101 can be configured to receive input signals from the various vehicle sensors to send output signals to the display device, for example. The controller 101 may also be in communication with one or more databases, memory, the internet, or networks for accessing additional information (e.g. maps, road information, weather, vehicle information). The controller may also be utilized with the in-cabin monitor system 103 to identify facial features of an occupant of the vehicle, as explained in more detail below.

Active suspension may be a type of automotive suspension that controls the vertical movement of the wheels relative to the chassis or vehicle body with an onboard system, rather than a passive suspension where the movement is being determined entirely by the road surface. Active suspensions may include pure active suspensions and adaptive/semi-active suspensions. While adaptive suspensions only vary shock absorber firmness to match changing road or dynamic conditions, active suspensions may use some type of actuator to raise and lower the chassis independently at each wheel. Such features may allow car manufacturers to achieve a greater degree of ride quality and car handling by keeping the tires perpendicular to the road in corners, allowing better traction (engineering) and control. An onboard computer may also detect body movement from sensors throughout the vehicle and, using data calculated by opportune control techniques, controls the action of the active and semi-active suspensions. The system may virtually eliminate body roll and pitch variation in many driving situations including cornering, accelerating, and braking.

The system may utilize the DSM to identify different types of driving characteristics and attribute a driving profile to those drivers. In one scenario, the system may recognize that the driver is a calm driver. The system may utilize the sensors to determine that the calm driver is focused and relaxed. The calm driver may be one profile that is labeled by the DSM system. In another scenario, the system may recognize that the driver is a nervous driver. The nervous driver may be identified due to sensors focusing on facial recognition, sound recognition (e.g. change of pitch of voice), and blood pressure/pulse. The nervous driver may be another profile that is labeled by the DSM system. In another scenario, the system may recognize that the driver is a distracted and/or emotional driver. The DSM may utilize the facial recognition cameras to identify that a driver is not keeping their eyes on the roads. Additionally, the DSM may utilize sensors on the steering wheel to identify that the user may not be placing their hands on the steering wheel.

Figure 2:
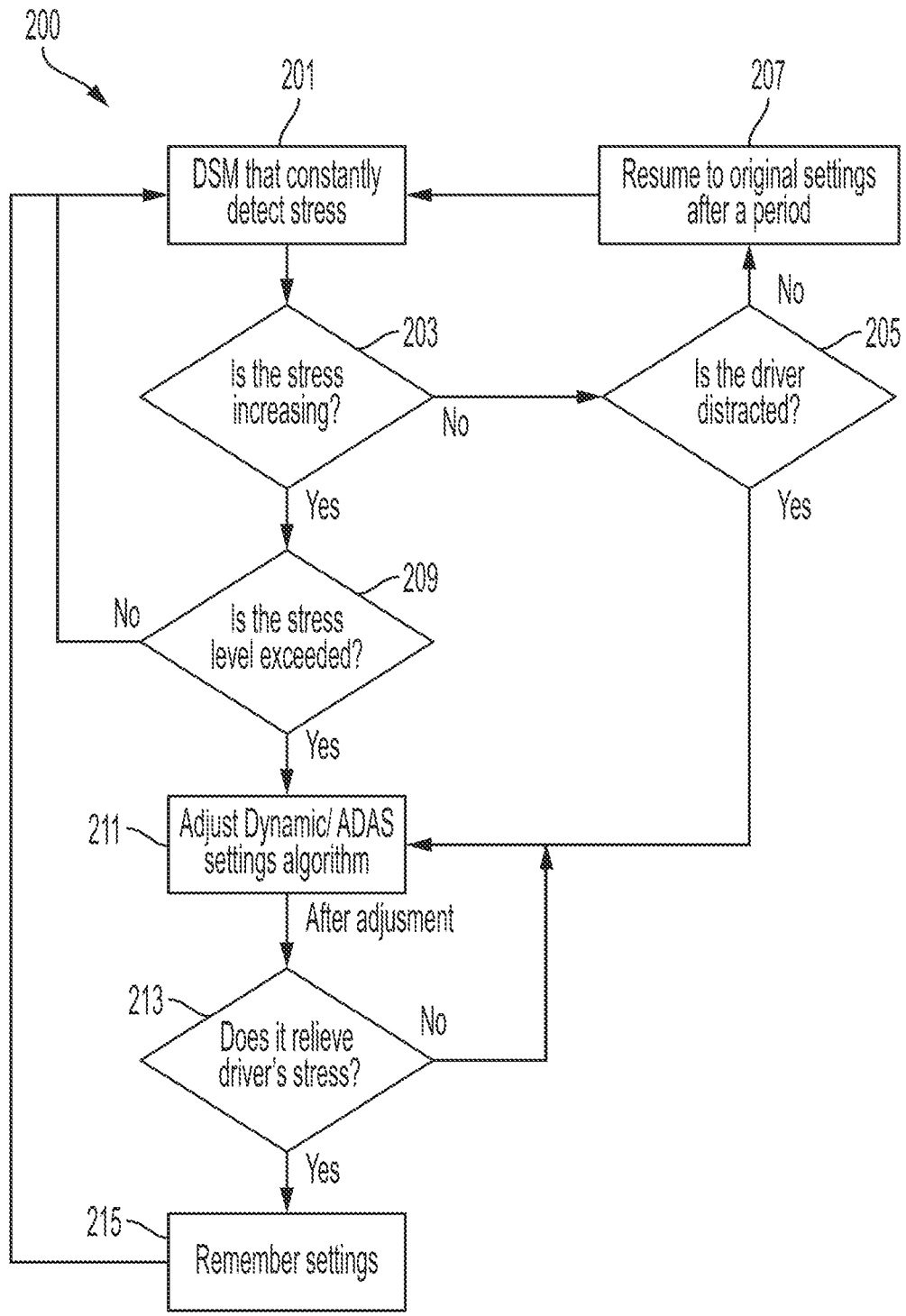
FIG. 2 is an exemplary flow chart 200 of an adaptive advanced driving assistance system with stress determination via a driver status monitor (DSM) and machine learning.

FIG. 2 is an exemplary flow chart 200 of an adaptive advanced driving assistance system with stress determination via a DSM and machine learning. The DSM may be constantly monitoring or detecting stress of the driver or occupant at step 201. As explained above, the DSM may utilize various sensors and data to detect a stress of the driver or occupant. The system may utilize such data to label the driver as clam, nervous, etc. The DSM may also have a stress threshold that determines a pre-defined value for a driver to not exceed in order to be labeled calm or not stressful. The sensors may collect information and process such information into data that is utilized to define a stress level of the driver.

The DSM may then determine if the stress level has increased or is increasing at step 203. The DSM may utilize the stress load information collected by the various vehicle sensors (as discussed above) to determine if the stress level of the occupant fluctuated. If the driver's stress has been determined to increase, the system may then proceed to see if the driver's stress has increased passed a threshold that is defined to determine when the vehicle system may be utilized to help combat the fluctuation of the stress load of the user, as explained below. In an embodiment, the system may not need to evaluate the user's distraction level if the stress level has increased and went past a threshold. In another embodiment, the user may have a low stress level, however, the user may need to be evaluated based on driver distraction.

At step 205, the DSM may then determine if the driver is distracted. The system may utilize information collected regarding the cognitive load to determine if a driver is distracted. The system may have a driver distraction threshold that may define a distracted driver from a driver in normal operation. While the stress level of the driver may evaluate the driver, the driver distraction data may be utilized to evaluate the environment and/or cognitive load of the user. The driver distraction load exceeds a driver-distraction threshold. If the driver is not distracted, the system may resume the original setting of the vehicle after a period of time as shown in step 207. For example, the system may monitor a user's eye gaze direction to see if the occupant is failing to drive a task. In another example, the system may monitor a user's blood pressure to see if it is too high and in an unsafe state. In another example, the system may monitor whether the cognitive load is too high if the user continuously fails to make the right choice.

If the DSM determines that the stress level has increased, it may the monitor the driver to see if the stress level has exceeded a threshold at step 209. If the stress hold has been exceeded, it may adjust the dynamic settings of the vehicle or the ADAS settings algorithm at step 211. As discussed above, the dynamic settings may include suspension settings, ACC (automated cruise control) settings, adjustment of the throttle (e.g. acceleration pedal), etc. As discussed below with respect to FIG. 4 the vehicle dynamic settings may be adjusted to help lower a stress level of a driver/occupant. In another embodiment, the system may not need to evaluate whether the occupant's stress has increased over time if the stress level is so high that it exceeds the threshold level at a steady-state. Thus, the occupant may be recovering from stress and it may be unsafe to drive because of the distraction associated with the stress.

Figure 3:
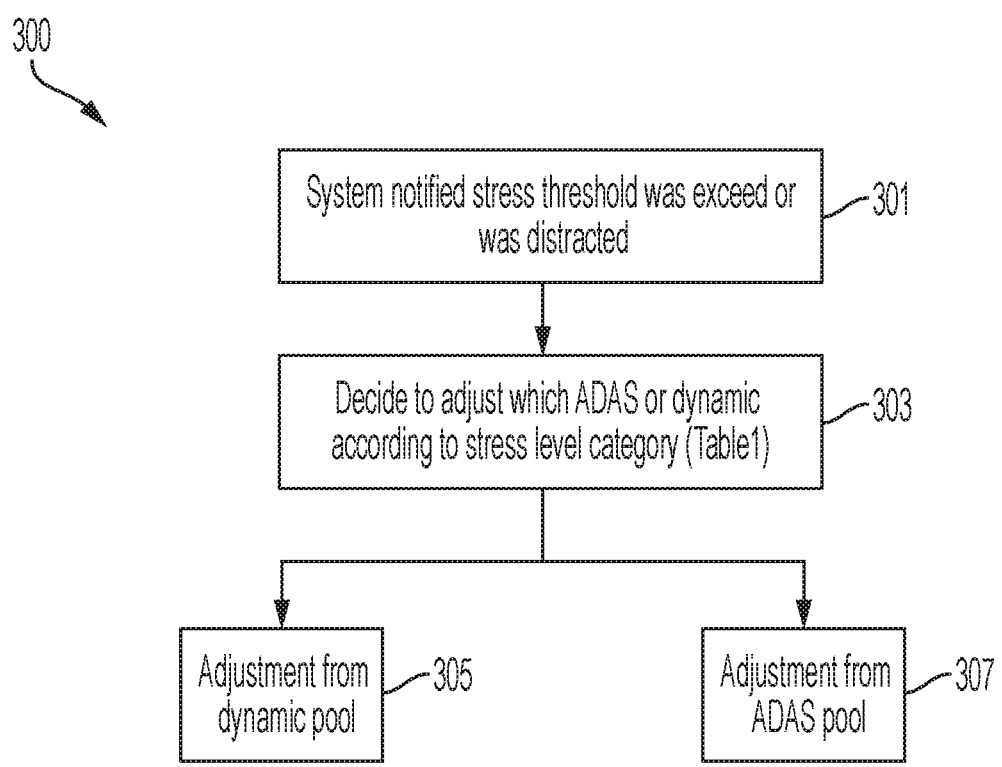
FIG. 3 illustrates an exemplary flow chart 300 of dynamic adjustment of an advanced driver assistance system (ADAS) features.

At step 211, the system may adjust the dynamic/ADAS settings algorithm. For example, the system may adjust a dynamic vehicle feature or setting in the event a workload of the driver has passed a threshold. The system may also respond by activating a feature or setting in response to the stress level exceeding the defined stress hold. FIG. 3 discussed below may provide additional insight as to the adjustment of the dynamic/ADAS settings. The system may allow for the activation/adjustment of the feature over a certain time period. In certain scenarios, the occupant's stress may not be lowered because of an emergency situation, and thus the system will continue to activate or adjust safety features.

At step 213, the system may evaluate if the adjustment contributed to relieve the driver's stress. The system may monitor the driver's stress upon adjustment or activation of the vehicle features to determine if the stress load has improved (e.g. stress has decreased). The system may store information to determine whether adjustment or activation of certain features helps facilitate in decreasing the stress or workload of a driver. For example, the system may learn that activating an autonomous driving feature helps reduce the occupant's stress.

At step 215, the system may evaluate if the system remembers settings. The system may monitor if the adjustment of the feature contributed to lowering the stress level of the occupant, and therefore, may stores such information in memory. If the driver experiences a similar scenario (e.g. high stress level), the system may revert to the adjustment/activation of the feature that contributed to lowering the stress level. The information of the features or adjustment that contributed to a lower stress level of the driver or reduced driver distraction may be utilized in step 211 when adjusting settings or input to the algorithm to utilize the successful features.

FIG. 3 illustrates an exemplary flow chart 300 of dynamic adjustment of an advanced driver assistance system (ADAS) features. At step 301, the system may receive a dynamic adjustment request. The processor may receive the request from the DMS. Thus, the processor is notified that it should adjust a vehicle driving feature, such as an ADAS feature. Some relevant ADAS features may include blind sport warning, lane keep assist, and automated riving. The ADAS features that may be adjusted may include the warning distance or warning intensity for the blind spot warning, ACC following speed/distance, lane keep assist turned on or off, automated driving turned on or off, etc.

At step 303, the system may activate or adjust the ADAS feature or vehicle dynamic setting. For example, the system. The processor may be notified that it should adjust a vehicle driving feature, such as an vehicle dynamic driving feature. Such vehicle dynamic driving features may include throttle travel (acceleration), brake pedal stiffness, suspension stiffness, lateral movement, power steering, steering forgiveness, etc. The system may adjust the feature based on the table shown in FIG. 4. The table of FIG. 4 may represent a look-up table that is utilized to define how the vehicle system adjusts various features/settings when a stress level category is identified. Thus, each category of the stress level of an occupant may coincide with a different activation/adjustment of a feature.

At step 305, the system may have an adjustment from the dynamic pool. The dynamic pool may include features related to dynamic vehicle settings. The relevant features may include adjustment of the throttle travel (e.g. acceleration), brake pedal stiffness or suspension stiffness, and lateral movement, power steering, and steering forgiveness. Thus, the system may be in communication with controllers that operate the vehicle suspension, brake control module, throttle travel, etc. The system may activate or adjust such vehicle dynamic features. The system, for example, may soften the suspension and/or throttle or adjustment of the acceleration pedal in one example.

At step 307, the system may have an adjustment from the ADAS pool. The dynamic pool may include features related to the ADAS features. Such relevant ADAS features may include blind spot warning distance and the warning intensity. The adjustments may be related to how the ADAS feature operates. In one example, the ADAS feature that may be adjusted may be the automated cruise control (ACC) system. The ACC system may be adjusted by increasing a distance between the vehicle that the occupant is in and the lead vehicle. In another embodiment, the ACC speed that the vehicle is driving at may be decreased. Other items that may be adjusted may include the blind spot warning distance (e.g. increase the distance of the blind spot) and the warning intensity, activating lane keep assist, and/or activating automated or semi-autonomous driving.

FIG. 4 illustrates an exemplary table of driver stages of stress level categories. The table may show various stages that are utilized to convert a driver labeled as "nervous" based on various data to a calm driver. The table may show the driver stage, issues with each driver stage, stress level for each driver stage, target solution for each stage, and a proposed solution for each stage.

One stage for a driver may be a calm stage. The calm stage may be the ideal stage for the driver. If the data determines that a driver is calm, it may not need a solution to countermeasure the behavior. Thus, the system may be achieving a calm stage for the driver if the user is any other driver stage (e.g. nervous, distracted/emotional, isolation seeking, etc.). The system may define the calm level based on a stress threshold level that the users stress falls below.

Another stage for a driver may be a nervous stage. In a nervous stage for the driver, the driver may have the issue that it has lost situational awareness because of too much focus at their front. Some possible issues that may occur when the driver is in a nervous stage is that the user may miss blind spots and exits. Another issue is that the user may slam the brakes or throttle when the driver is nervous. At the nervous stage, the user may have a high stress level. The target solution may be to get the user to a non-distracted but stress level over a threshold? As a proposed solution, the system may attempt to change dynamic settings to a smoother drive. For example, the system may adjust ADAS features. In one example, the system may adjust warning for more audible/visible warnings in the blind spot monitor. The system may also activate a "DO NOT DISTURB" mode (e.g. postpone or delay alerts/messages to the driver) to reduce possible distractions. Such a "DO NOT DISTRUB" mode may prevent the alerts or messages to be presented to the driver until the system determines that the driver's stress has dropped below a defined threshold.

Another stage that the system may evaluate for is whether the driver may be a distracted or emotional stage. The issues at such a stage may be that the driver may be easy to immerse in a secondary task and lost in situational awareness. The stress level of the driver (identified by data collected/generated from the sensors) may be very high in one example, or it may be very low but distracted in another. The target solution may be to have a stress level exceed a threshold or distract. The proposed solution may be to soften the vehicle dynamics and disengage from a high-speed pursuit. The system may also automatically engage autonomous driving if the driver lost the ability to driver responsibly.

Another stage that the system may evaluate for is whether the driver is isolation seeking. During an isolation seeking stage, the driver may be immersed in their own thoughts and world and lost on situational awareness. The driver may be focusing and thinking about other things than driving and the vehicle environment. However, the driver may be in a very low stress mood. The target solution for the driver may be to get them to be not distracted but their stress level is too low, that they are almost in a sleep stage.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system in a vehicle, comprising:
   one or more physiological sensors configured to obtain stress-load data indicating a stress load of an occupant of the vehicle;
   one or more sensors configured to obtain driver distraction data of the occupant;
   a controller in communication with the one or more sensors, wherein the controller is configured to:
   determine a first stress load of the occupant utilizing at least the stressload data;
   output an instruction to execute a vehicle driving-dynamics features when the first stress load exceeds a threshold, wherein the vehicle driving-dynamics features includes adjusting an active suspension of the vehicle and adjusting a warning level for audible visible warnings in a blind spot monitor in response to the stress-load data; and
   in response to adjusting the active suspension of the vehicle and adjusting the warning level determine a second stress load of the occupant utilizing at least the stress-load data of the occupant and store in memory the adjustment of the active suspension and the adjustment of the warning level if the second stress load falls below the threshold.

2. The system of claim 1, wherein the controller is further configured to output on a vehicle display a notification including an option for a driver of the vehicle to activate the vehicle driving-dynamics feature.

3. The system of claim 1, wherein the controller is further configured to determine if the stress load is increasing over a duration period.

4. The system of claim 1, output an instruction to terminate the vehicle driving-dynamics features when the stress load falls below the threshold.

5. The apparatus of claim 1, wherein the controller is further configured to activate a do not disturb mode configured to withhold incoming messages in response to the first load exceeding the threshold.

6. A system in a vehicle, comprising:
   one or more physiological sensors configured to obtain stress-load information indicating a stress load of an occupant of the vehicle;
   one or more sensors configured to obtain driver distraction data of the occupant;
   a display configured to output information;
   a controller in communication with the one or more physiological sensors and the display, wherein the controller is configured to:
   determine a first stress load of the occupant utilizing at least the stressload information;
   output an instruction to execute a vehicle driving-dynamics features when the first stress load exceeds a threshold, wherein the vehicle driving-dynamics features includes adjusting an active suspension of the vehicle and adjustment of sensitivity of a blind spot monitoring system;
   output on the display a notification of activating the vehicle driving-dynamics; and
   in response to adjusting the active suspension of the vehicle and adjusting sensitivity of the blind spot monitoring system, determine a second stress load of the occupant utilizing at least the stress-load data of the occupant and store in memory the adjustment of the active suspension and the adjustment of the sensitivity of the blind spot monitoring system if the second stress load falls below the threshold.

7. The system of claim 6, wherein the controller is further configured to terminate the vehicle driving-dynamics features when the stress load falls below the threshold and output on a vehicle display a termination notification that the vehicle driving-dynamics feature has been terminated.

8. The system of claim 6, wherein the adjusting the active suspension of the vehicle includes sending instructions to loosen the active suspension of the vehicle.

9. The system of claim 6, wherein the adjusting the active suspension of the vehicle includes sending instructions to tighten the active suspension of the vehicle.

10. The system of claim 6, wherein the controller is further configured to output on a vehicle display a notification including an option for a driver of the vehicle to activate the vehicle driving-dynamics feature.

11. The system of claim 6, wherein the controller is further configured to determine if the stress load is increasing over a duration period.

12. The system of claim 6, output an instruction to terminate the vehicle driving-dynamics features when the stress load falls below the threshold.

13. The system of claim 6, wherein the controller is further configured to activate a do not disturb mode configured to withhold incoming messages in response to the first load exceeding the threshold.

14. A method in a vehicle, comprising:
   obtaining stress-load data of an occupant of the vehicle from one or more vehicle sensors:

determining a first stress load of the occupant utilizing at least the stress-load data;

activating a vehicle driving-dynamics features when the first stress load exceeds a stress threshold, wherein activating the vehicle driving dynamics feature includes adjusting a sensitivity associated with a blind spot monitoring system;

notifying the occupant of activation of the vehicle driving-dynamics features; and in response to activating the vehicle driving-dynamics feature and adjusting the sensitivity, determine a second stress load of the occupant utilizing at least the stress-load data of the occupant and store in memory the activating of the vehicle driving-dynamics feature and the adjustment of the sensitivity when the second stress load falls below the stress threshold.

15. The method of claim 14, wherein activating the vehicle driving-dynamics features further includes adjusting throttle travel.

16. The method of claim 14, wherein the method further includes activating an advanced driver assistance system features when the stress load exceeds the stress threshold.

17. The method of claim 14, the method includes obtaining driver distraction data of the occupant of the vehicle from one or more vehicle sensors;

determining a driver distraction load of the occupant utilizing at least the driver distraction data; and activating the vehicle driving-dynamics features when the driver distraction load exceeds a driver-distraction threshold.

18. The method of claim 17, wherein the driver distraction data is obtained from one or more vehicle sensors configured to monitor the occupant.

19. The method of claim 14, wherein activating the vehicle driving-dynamics feature when the first stress load exceeds the stress threshold is in response to previous activation of the vehicle driving dynamics feature that contributed to lowering the stress level.

20. The method of claim 18, wherein the method includes activating an autonomous driving feature when the driver distraction load exceeds the driver-distraction threshold and the first stress load exceeds the threshold.

* * * * *